US008635774B2

(12) United States Patent
Hoisington et al.

(10) Patent No.: US 8,635,774 B2
(45) Date of Patent: Jan. 28, 2014

(54) METHODS OF MAKING A PRINTHEAD

(75) Inventors: Paul A. Hoisington, Hanover, NH (US); John C. Batterton, Los Gatos, CA (US)

(73) Assignee: FUJIFILM Dimatix, Inc., Lebanon, NH (US)

(*) Notice: Subject to any disclaimer, the term of this patent is extended or adjusted under 35 U.S.C. 154(b) by 837 days.

(21) Appl. No.: 11/409,635

(22) Filed: Apr. 24, 2006

(65) Prior Publication Data

US 2006/0192808 A1 Aug. 31, 2006

Related U.S. Application Data

(62) Division of application No. 10/782,367, filed on Feb. 19, 2004, now Pat. No. 7,052,122.

(51) Int. Cl.

| | |
|---|---|
| ***B23P 17/00*** | (2006.01) |
| ***B21D 53/00*** | (2006.01) |
| ***B41J 2/135*** | (2006.01) |

(52) U.S. Cl.
USPC .......... 29/890.1; 347/44

(58) Field of Classification Search
USPC .......... 29/890.1; 347/44, 45
See application file for complete search history.

(56) References Cited

U.S. PATENT DOCUMENTS

| | | | | | |
|---|---|---|---|---|---|
| 4,413,268 | A | * | 11/1983 | Bentin | 347/47 |
| 4,751,532 | A | * | 6/1988 | Fujimura et al. | 347/55 |
| 4,788,556 | A | * | 11/1988 | Hoisington et al. | 347/92 |
| 4,825,227 | A | * | 4/1989 | Fischbeck et al. | 347/69 |
| 4,901,082 | A | * | 2/1990 | Schreiber et al. | 342/89 |
| 4,937,598 | A | * | 6/1990 | Hine et al. | 347/89 |
| 4,940,995 | A | * | 7/1990 | Hine et al. | 347/89 |
| 4,947,184 | A | * | 8/1990 | Moynihan | 347/45 |
| 4,961,082 | A | * | 10/1990 | Hoisington et al. | 347/92 |
| 4,995,940 | A | * | 2/1991 | Hine et al. | 216/27 |
| 5,125,969 | A | * | 6/1992 | Nishiwaki et al. | 106/31.52 |
| 5,159,353 | A | * | 10/1992 | Fasen et al. | 347/59 |
| 5,254,143 | A | * | 10/1993 | Anazawa et al. | 95/46 |
| 5,265,315 | A | * | 11/1993 | Hoisington et al. | 29/25.35 |

(Continued)

FOREIGN PATENT DOCUMENTS

| | | |
|---|---|---|
| JP | 61024458 | 2/1986 |
| JP | 62042707 | 2/1987 |

(Continued)

OTHER PUBLICATIONS

Kim et al., "Nanostructured Surfaces for Dramatic Reduction of Flow Resistance in Droplet-Based Microfluidics", IEEE Conf. MEMS, Las Vegas, NV, pp. 479-482, Jan. 2002.

(Continued)

*Primary Examiner* — David Angwin
(74) *Attorney, Agent, or Firm* — Fish & Richardson P.C.

(57) ABSTRACT

Among other things, a printhead is formed by actions that include providing a body of silicon material, forming in the body of silicon material at least a portion of a flow path in which fluid is to be pressurized, and forming in the body of silicon material at least a portion of a deaerator partition between a first region and a second region that are connected by a passageway. The deaerator partition is configured to remove gases or bubbles from the fluid. The first region is to be characterized by a first air pressure and the second region is to be characterized by an air pressure different for the first air pressure.

22 Claims, 5 Drawing Sheets

(56) References Cited

U.S. PATENT DOCUMENTS

| | | | | |
|---|---|---|---|---|
| 5,317,339 | A * | 5/1994 | Braun et al. | 347/87 |
| 5,489,930 | A * | 2/1996 | Anderson | 347/71 |
| 5,546,109 | A * | 8/1996 | Nakano | 347/93 |
| 5,649,359 | A * | 7/1997 | Murakami et al. | 29/890.1 |
| 5,659,346 | A * | 8/1997 | Moynihan et al. | 347/68 |
| 5,701,148 | A * | 12/1997 | Moynihan et al. | 347/92 |
| 5,742,313 | A * | 4/1998 | Hine | 347/92 |
| 5,757,391 | A * | 5/1998 | Hoisington | 347/11 |
| 5,808,643 | A * | 9/1998 | Tracy et al. | 347/92 |
| 6,190,492 | B1 * | 2/2001 | Byrne et al. | 156/273.7 |
| 6,402,311 | B1 * | 6/2002 | Inoue et al. | 347/92 |
| 6,457,820 | B1 * | 10/2002 | Cai et al. | 347/92 |
| 6,523,236 | B1 * | 2/2003 | Nishikawa et al. | 29/890 |
| 6,558,450 | B2 * | 5/2003 | Sengupta et al. | 95/46 |
| 6,584,687 | B1 * | 7/2003 | Yamamoto et al. | 29/890.1 |
| 6,651,335 | B2 * | 11/2003 | Akanabe et al. | 29/890.1 |
| 6,785,956 | B2 * | 9/2004 | Xu et al. | 29/611 |
| 6,880,926 | B2 * | 4/2005 | Childs et al. | 347/89 |
| 7,028,377 | B2 * | 4/2006 | Yasukawa et al. | 29/25.35 |
| 7,052,117 | B2 * | 5/2006 | Bibl et al. | 347/68 |
| 7,566,118 | B2 * | 7/2009 | Bibl et al. | 347/68 |
| 7,587,822 | B2 * | 9/2009 | Silverbrook | 29/890.1 |
| 2002/0066182 | A1 * | 6/2002 | Hostetler | 29/890.1 |
| 2003/0029037 | A1 * | 2/2003 | Debesis et al. | 29/890.1 |
| 2003/0142169 | A1 * | 7/2003 | Maeng et al. | 347/47 |
| 2003/0217450 | A1 * | 11/2003 | Okuno | 29/25.35 |
| 2004/0004649 | A1 * | 1/2004 | Bibl et al. | 347/68 |
| 2004/0088859 | A1 * | 5/2004 | Ito et al. | 29/890.1 |
| 2006/0016073 | A1 * | 1/2006 | Hostetler | 29/890.1 |

FOREIGN PATENT DOCUMENTS

| | | |
|---|---|---|
| JP | 7017050 | 1/1995 |
| JP | 7213804 | 8/1995 |
| JP | 2001158096 | 6/2001 |
| JP | 2002/18202 | 1/2002 |

OTHER PUBLICATIONS

Keiran Lindsey, "DMD00 The 2000 Guide to the Membrane Industry", Dec. 2000.

Robert T. DeHoff, "Capillarity Effects in Thermodynamics", Thermodynamics in Materials Science, pp. 355-401, 1993.

Office action issued in co-pending European application No. 05713809.1 dated Nov. 30, 2009.

Office action issued in co-pending Chinese application No. 200580008874.0 dated Mar. 6, 2009.

Office action issued in co-pending Chinese application No. 200580008874.0 dated Oct. 16, 2009.

Office action dated Feb. 3, 2010 in co-pending Taiwan application No. 94104436.

Office action dated Apr. 13, 2010 in co-pending European application No. 05713809.1.

Office action dated Apr. 8, 2010 in co-pending Chinese application No. 200580008874.0.

Office Action from corresponding Japanese Application No. 2006-554247, issued Nov. 9, 2010, 15 pages.

Office action in co-pending Korean application No. 10-2006-7019281, dated Aug. 1, 2011, 7 pages.

Office action dated Jun. 28, 2011 issued in co-pending Japanese application No. 2006-554247, 7 pgs.

Office Action in co-pending Japanese application No. 2011-104272 dated Dec. 20, 2011.

Office action dated Aug. 7, 2012 in Japanese application No. 2011-104272, 3 pages.

International Search Report in International Application No. PCT/US2005/05264, mailed Sep. 19, 2005, 10 pages.

International Preliminary Report in International Application No. PCT/US2005/005264, mailed Nov. 7, 2006, 5 pages.

* cited by examiner

FIG. 3A
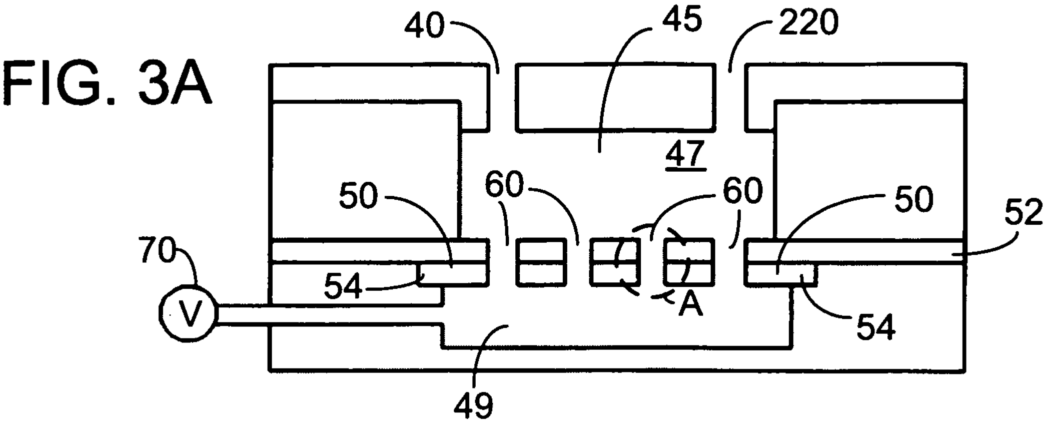
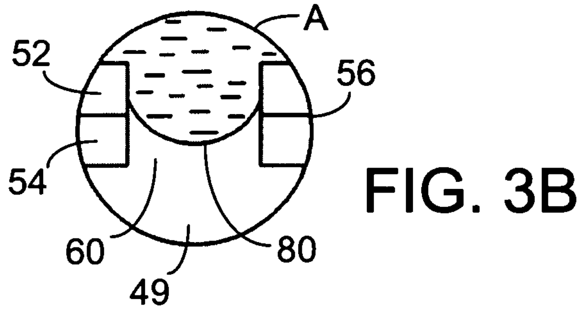
FIG. 3B
FIG. 5A
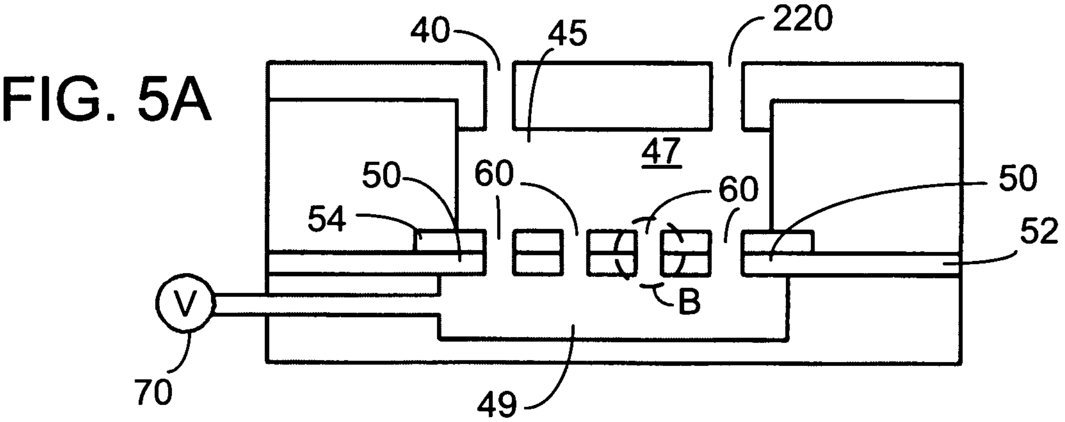
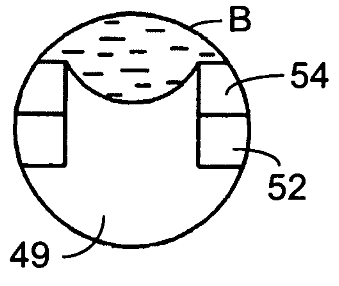
FIG. 5B

METHODS OF MAKING A PRINTHEAD

CROSS-REFERENCE TO RELATED APPLICATION

This application is a divisional application and claims priority under 35 U.S.C. § 121 to U.S. Ser. No. 10/782,367, filed on Feb. 19, 2004, which is incorporated herein by reference in its entirety.

TECHNICAL FIELD

This invention relates to printheads.

BACKGROUND

Ink jet printers typically include an ink path from an ink supply to a nozzle path. The nozzle path terminates in a nozzle opening from which ink drops are ejected. Ink drop ejection is controlled by pressurizing ink in the ink path with an actuator, which may be, for example, a piezoelectric deflector, a thermal bubble jet generator, or an electro statically deflected element. A typical printhead has an array of ink paths with corresponding nozzle openings and associated actuators, such that drop ejection from each nozzle opening can be independently controlled. In a drop-on-demand printhead, each actuator is fired to selectively eject a drop at a specific pixel location of an image as the printhead and a printing substrate are moved relative to one another. In high performance printheads, the nozzle openings typically have a diameter of 50 microns or less, e.g. around 35 microns, are separated at a pitch of 100-300 nozzle/inch, have a resolution of 100 to 3000 dpi or more, and provide drop sizes of about 1 to 70 picoliters or less. Drop ejection frequency is typically 10 kHz or more.

Hoisington et al. U.S. Pat. No. 5,265,315, describes a printhead assembly that has a semiconductor body and a piezoelectric actuator. The body is made of silicon, which is etched to define ink chambers. Nozzle openings are defined by a separate nozzle plate, which is attached to the silicon body. The piezoelectric actuator has a layer of piezoelectric material, which changes geometry, or bends, in response to an applied voltage. The bending of the piezoelectric layer pressurizes ink in a pumping chamber located along the ink path. Piezoelectric ink jet print assemblies are also described in Fishbeck et al. U.S. Pat. No. 4,825,227, Hine U.S. Pat. No. 4,937,598, Moynihan et al. U.S. Pat. No. 5,659,346, and Hoisington U.S. Pat. No. 5,757,391, the entire contents of which are hereby incorporated by reference.

Printing accuracy of printheads, especially high performance printheads, is influenced by a number of factors, including the size and velocity uniformity of drops ejected by the nozzles in the printhead. The drop size and drop velocity uniformity are in turn influenced by a number of factors, such as, for example, the contamination of the ink flow paths with dissolved gasses or bubbles. Deaeration of ink is described in Hine et al. U.S. Pat. No. 4,940,955, Hoisington, U.S. Pat. No. 4,901,082, Moynihan et al. U.S. Pat. No. 5,701,148, and Hine U.S. Pat. No. 5,742,313, the entire contents of all of which is hereby incorporated by reference.

SUMMARY

In an aspect, the invention features a drop ejection device, such as for example a printhead device. The drop ejection device includes a flow path in which fluid is pressurized for ejection of a drop from a nozzle opening and a deaerator that includes a fluid reservoir region, a vacuum region, and a partition between the fluid reservoir region and the vacuum region. The partition of the deaerator includes a wetting layer and a non-wetting layer and one or more channels extending through the wetting and non-wetting layers. The wetting layer is exposed to the fluid reservoir region.

Embodiments may include one or more of the following. The channels in the partition have a width of about 0.1 micron to about 5 microns. The channels are through-holes. The flow path and the deaerator are in a silicon material body. The surface energy of the wetting layer of the partition is about 40 dynes/cm or more as determined according to the dynes test. The wetting layer is a silicon material. The non-wetting layer has a surface energy of about 25 dynes/cm or less as determined according to the dynes test. The non-wetting layer is a polymer. The non-wetting layer is a fluoropolymer. The non-wetting layer has a thickness of about 2 microns or less. The wetting layer has a thickness of about 25 microns or less.

Embodiments may include one or more of the following. The device includes a piezoelectric actuator. The nozzle opening in the device has a width of about 200 microns or less. The device includes a plurality of fluid paths and a plurality of corresponding deaerators.

In an aspect, the invention features a drop ejection device including a flow path in which fluid is pressurized for ejecting a drop from a nozzle opening, and a deaerator including a partition having at least one aperture between a fluid reservoir region and a vacuum region. At least a part of the flow path of the device is defined by a silicon material and the deaerator includes a silicon material.

Embodiments may include one or more of the following. The partition of the deaerator includes silicon dioxide. The silicon material defining the flow path and the silicon material in the deaerator are in a common body of silicon material. The common body of silicon material is an SOI structure. The partition includes a polymer material. The flow path in the deaerator includes a pressure chamber.

In an aspect, the invention features a fluid deaerator portion including a first layer having a surface energy of about 40 dynes/cm or more as determined according to the dynes test, a second layer having a surface energy of about 25 dynes or less as determined according to the dynes test, and a plurality of channels having a diameter of about 5 microns or less.

Embodiments may include one or more of the following. The first layer of the deaerator portion is a silicon material. The second layer of the deaerator portion is a fluoropolymer.

In an aspect, the invention features a method of drop ejection. The method includes providing a flow path in which fluid is pressurized for ejecting drops from a nozzle. Prior to pressurizing the fluid, exposing the fluid to a deaerator. The deaerator includes a fluid reservoir region, a vacuum region, and a partition between the reservoir region and the vacuum region, wherein the partition includes a wetting layer and a non-wetting layer and one or more channels through the wetting layer and the non-wetting layer. The next step of the method includes directing the fluid into the reservoir region, and providing a vacuum in the vacuum region that prohibits fluid flow into the vacuum region through channels.

Embodiments may include one or more of the following. A radius of one of the channels in the partition is less than a value defined by two times the surface energy of the fluid divided by the vacuum pressure. The vacuum has a vacuum pressure of about 10 to 27 mmHg.

In an aspect, the invention features a method of forming a deaerator partition. The method includes providing a silicon material, forming a polymer layer on the silicon material, and forming one or more channels through the silicon material and polymer layer.

Embodiments may include one or more of the following. The silicon material provided is silicon dioxide. The polymer is formed by depositing a polymer or monomer. The channels are formed by laser drilling. The channels are formed by etching. The method further includes etching the silicon material to reduce its thickness. The method includes providing a silicon on silicon dioxide structure, forming a polymer layer on the silicon dioxide, and etching the silicon to the silicon dioxide layer.

In an aspect, the invention features a method of forming a printhead. The method includes providing a body of silicon material, defining in the body of silicon material at least a portion of a flow path in which fluid is pressurized, and defining in the body of silicon material at least a portion of a deaerator partition.

In an aspect, the invention features, a deaerator including a partition having at least one through-hole extending between a fluid reservoir region and a vacuum region. At least a portion of the at least one through-hole has a non-wetting surface.

Embodiments may include one or more of the following. The partition can include a single layer. The partition can include two or more layers. The through-holes can have a diameter of about 1 micron or less, particularly about 200 nanometers to about 800 nanometers.

Embodiments may have one or more of the following advantages. The partition can be incorporated into the fluid supply path of a printhead, allowing the ink to be degassed in close proximity to a pumping chamber. As a result, the ink can be degassed efficiently, which leads to improved purging processes within the printhead as well as improved high frequency operation. As a further result, the size of the printhead can be reduced by the incorporation of the partition within the ink supply path and the elimination of a separate deaeration device. The deaerator can be formed using silicon or other semiconductor materials.

Other aspects, features, and advantages will be apparent from the description and drawings, and from the claims.

DESCRIPTION OF DRAWINGS

FIG. 3A is a cross-sectional view of a portion of a deaerator, while FIG. 3B is an enlarged view of an area labeled A in FIG. 3A.

FIG. 5A is a cross-sectional view of a deaerator, while FIG. 5B is an enlarged view of an area labeled B in FIG. 5A.

Like reference symbols in the various drawings indicate like elements.

DETAILED DESCRIPTION

Figure 1:
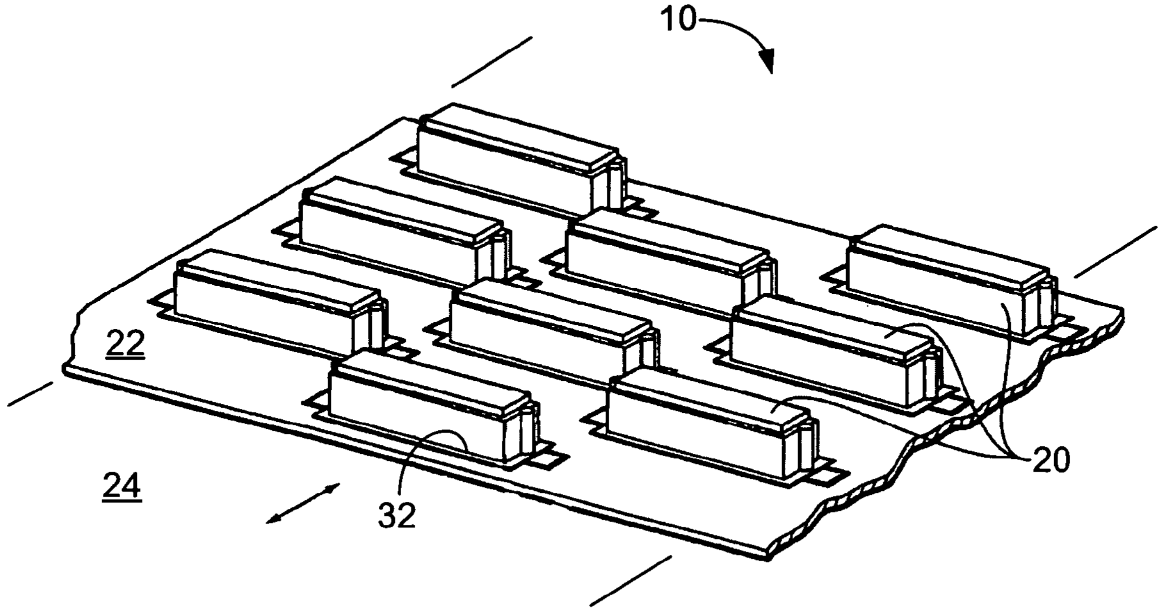
FIG. 1 is a perspective view of a printing apparatus.

Referring to FIG. 1, an ink jet printhead 10 includes printhead units 20 held in a manner that they span a sheet 24, or a portion of the sheet, onto which an image is printed. The image can be printed by selectively jetting ink from the units 20 as the printhead 10 and the sheet 24 move relative to one another (arrow). In the embodiment in FIG. 1, three sets of printhead units 20 are illustrated across a width of, for example, about 12 inches or more. Each set includes multiple printhead units, in this case three, along the direction of relative motion between the printhead 10 and the sheet 24. The units can be arranged to offset nozzle openings to increase resolution and/or printing speed. Alternatively, or in addition, each unit in each set can be supplied ink of a different type or color. This arrangement can be used for color printing over the full width of the sheet in a single pass of the sheet by the printhead.

Figure 2:
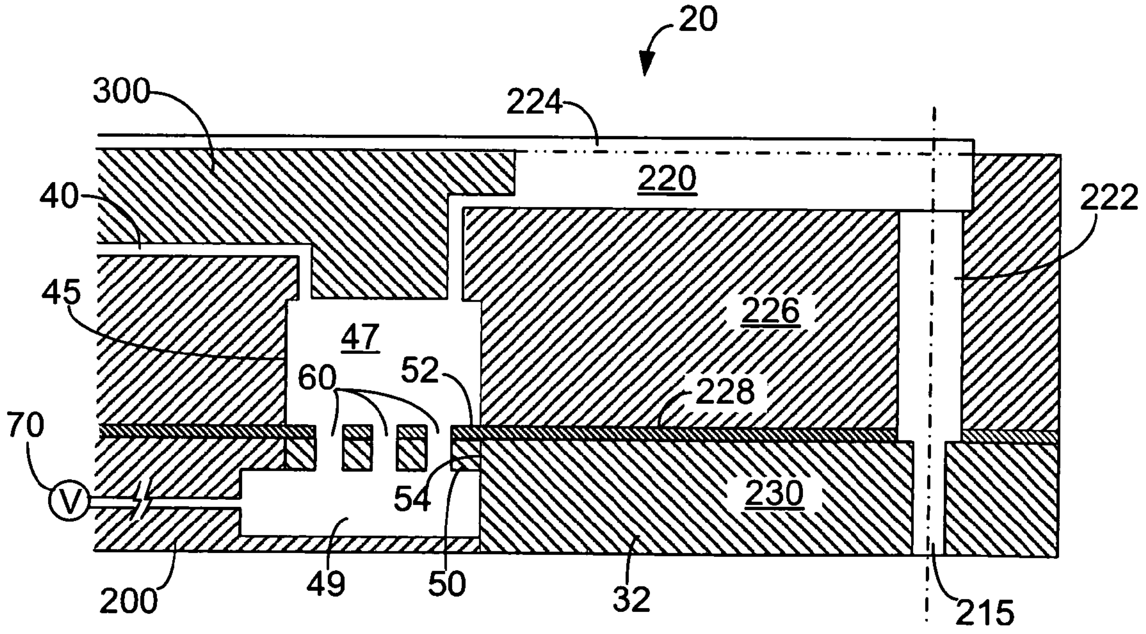
FIG. 2 is a cross-sectional view of a portion of a printing apparatus.

Referring to FIG. 2, each printhead unit 20 includes a plurality of flow paths in which fluid can be pressurized to eject ink from a corresponding nozzle opening. In the embodiment illustrated, a flow path includes a pumping chamber 220, a nozzle path 222, and a nozzle 215. Fluid is pressurized in the pumping chamber 220 by a piezoelectric actuator 224. Features of the flow path are formed in a body of a material that can be etched by wet or plasma etching techniques. Examples of materials that can be etched using wet or plasma etching techniques include silicon materials (e.g., silicon wafer, a silicon on insulator wafer (SOI)) and ceramic materials (e.g., a sapphire substrate, an alumina substrate, an aluminum nitride substrate). In the embodiment shown in FIG. 2, the flow path is etched into an SOI wafer which includes an upper silicon layer 226, a buried silicon dioxide layer 228, and a lower silicon layer 230. A printhead having flow path features in silicon material is further described in U.S. patent application Ser. No. 10/189,947, filed on Jul. 3, 2002, and U.S. Ser. No. 60/510,459 filed Oct. 10, 2003, the entire contents of both of which is hereby incorporated by reference.

Upstream of the pumping chamber 220 along the ink flow path is a deaerator 45. The deaerator 45 includes a fluid reservoir region 47, a partition 50, and a vacuum region 49 in communication with a vacuum source 70. The partition 50 includes passageways 60 between the reservoir region 47 and the vacuum region 49. The partition 50 also includes a wetting layer 52 and a non-wetting layer 54. The fluid reservoir region 47 is a region along the ink flow path that receives fluid from a supply path 40 and exposes the fluid to the partition 50. In the vacuum region 49, the pressure is maintained by the vacuum source 70 at a pressure lower (e.g., 10 to 27 mmHg) than the pressure in the reservoir region (e.g., 600 mmHg to 800 mmHg).

Referring as well to FIGS. 3A and 3B, fluid in reservoir region 47 contacts partition 50 and enters passageways 60 where a meniscus 80 is formed at the interface between the wetting and non-wetting layers 52, 54. The fluid in the reservoir region is exposed, through the passageways 60, to the lower pressure in the vacuum region 49, which extracts air and other gasses from the fluid. Fluid from the reservoir region enters pumping chamber 220 where it is pressurized for ejection. The size of the passageways, magnitude of the vacuum, and the materials of the partition layers are selected such that fluid is drawn into the passageways, but not drawn through the passageways into the vacuum region 49.

The shape of a liquid, solid, vapor interface at equilibrium conforms to a minimum total interfacial energy for the boundaries present. A contact angle, θ, which describes the shape of the interface, is determined through a force balance of the competing interfacial energies ($\gamma_{lv}$, which is the interfacial energy of the liquid-vapor interface, $\gamma_{sl}$, which is the interfacial energy of the liquid-solid interface, and $\gamma_{sv}$, which is the interfacial energy of the solid-vapor interface). The contact angle is described by the following equation:

$$\cos(\theta) = \frac{\gamma_{sv} - \gamma_{sl}}{\gamma_{lv}} \quad \text{Equation (1)}$$

A value of 90° for the contact angle is general defined as the difference between wetting and non-wetting. For example, a contact angle greater than 90° defines an interface in which the liquid does not wet the solid surface, but rather balls up on the surface. A contact angle of less than 90° defines an interface in which the liquid wets the surface.

The materials used for the wetting layer 52 and the non-wetting layer 54 are selected with Equation (1) in mind, such that the contact angle between the wetting layer and the fluid in the passageway is less than 90° and the contact angle between the non-wetting layer and the fluid is greater than 90°. As a result, fluid within the reservoir region 47 wets the passageway 60 along the wetting layer 52, until the fluid intersects an interface 56 between the wetting and non-wetting layers. At the interface, due to the change in contact angle between the liquid and the walls of the passageway formed of non-wetting layer 54, the ink forms meniscus 80.

In order to maintain meniscus 80 within the passageways 60, the pressure of the meniscus, $P_m$, must be greater than the vacuum pressure, $P_v$, used to remove gasses and bubbles from the ink (i.e., $P_m > P_v$). The pressure of the meniscus is defined as:

$$P_m = \gamma_{1v}(r_1^{-1} + r_2^{-1}) \quad \text{Equation (2)}$$

That is, the pressure created by the meniscus is equal to the surface energy of the liquid, $\gamma_{lv}$, times the principal radii of the meniscus, $r_1 + r_2$. The principal radii describe local surface curvature of the meniscus and as such define the geometry of the surface of the meniscus.

For a meniscus within a cylindrical passageway having a diameter of 2R, the curved surface of the meniscus is described by $r_1 = r_2 = R/\sin(\theta - 90°)$ and the equation for meniscus pressure can be reduced to:

$$P_m = \frac{2(\gamma_{lv})\sin(\theta - 90°)}{R} \quad \text{Equation (3)}$$

To maintain the meniscus in the passageway, the vacuum pressure, $P_v$, should be:

$$P_v < \frac{2(\gamma_{lv})\sin(\theta - 90°)}{R} \quad \text{Equation (4)}$$

As such, when a vacuum pressure of $P_v$ is created in deaerator 45, ink will be drawn into the passageways to form meniscus 80. The radius of the passageway, R, should be defined by the following expression:

$$R \le \frac{2(\gamma_{lv})\sin(\theta - 90°)}{P_v} \quad \text{Equation (5)}$$

For a perfectly non-wetting layer (e.g., θ=180°) the above equation reduces to:

$$R \le \frac{2(\gamma_{lv})}{P_v} \quad \text{Equation (6)}$$

As a result, in a deaerator having partition 50 and used for degassing a fluid that has a surface energy of 30 dynes/cm, the radius of the passageway should be less than about 0.6 micron to support a meniscus at 1 atmosphere of pressure.

The radius of the passageway can also be described in relation to the surface energy of the solid-liquid and solid-vapor interfaces of the non-wetting layer 54. After substituting $-\cos(\theta)$ for $\sin(\theta-90)$, and replacing $\cos(\theta)$ with Equation 1, Equation 5 can be reduced to:

$$R \le \frac{2(\gamma_{sl} - \gamma_{sv})}{P_v} \quad \text{Equation (7)}$$

Further discussion of surface energy and related thermodynamic calculations can be found in chapter 12 of "Thermodynamics in Materials Science" by Robert T. DeHoff, McGraw-Hill, Inc. New York, 1993, hereby incorporated by reference.

In embodiments, the radius of the passageways is about 5 microns or less, e.g., between about 5 microns and about 0.1 micron, and preferably between about 1.0 micron and 0.5 micron, for a vacuum pressure that is 1 atmosphere or less. A partition that has a fluid exposed surface area of several square centimeters typically includes thousands of passageways, such that 10% to 90% (e.g., 20% to 80%, 30% to 70%, 40% to 50%) of the partition is made up of open passageways.

In embodiments, the fluid, e.g., an ink, has a surface energy of about 25 dynes/cm to about 40 dynes/cm. The wetting layer 52 has a surface energy (e.g., $\gamma_{sl} - \gamma_{sv}$) equal to or greater than 40 dynes/cm as determined according to the dynes test. In general, the dynes test is used to determine the surface energy of a solid surface through the application of a series of fluids that each have a different surface energy level (e.g., 30 dynes/cm to 70 dynes/cm in+1 dynes/cm increments.) A drop of one of the fluids in the series is applied to the solid surface. If the drop wets the surface, then a drop of the next higher surface energy level fluid is applied to the solid surface. This process is continued until the drop of fluid does not wet the solid surface. The surface energy of the solid surface is determined to be the same as the surface energy of the first fluid in the series that does not wet the solid surface. Equipment and instructions for performing the dynes test are available from Diversified Enterprises, Claremont, N.H. An example of a suitable material for the wetting layer 52 is a silicon layer or an oxide layer, such as silicon dioxide. In embodiments, the wetting layer has a thickness of about 25 microns or less, e.g., 1 micron or less.

In embodiments, the non-wetting layer 54 has a surface energy of about 40 dynes/cm or less, such as 25 dynes/cm or less as determined according to the dynes test. In some embodiments, the non-wetting layer 54 has a surface energy that is between about 20 dynes/cm and about 10 dynes/cm as determined according to the dynes test. An example of a suitable material for the non-wetting layer 54 is a polymer, such as a fluoropolymer, e.g., Teflon. In embodiments, the non-wetting layer 54 has a thickness of about 2 microns, e.g. about 1 micron or about 0.5 micron. In particular embodiments, the ink has a viscosity of about 2 to 40 cps. The printhead is a piezoelectric inkjet printhead with nozzles having a nozzle width of about 200 micron or less, e.g., 10 to 50 micron, and the drop volume is about 1 to 700 pl. In embodiments, a non-wetting coating is provided around the nozzle openings. The non-wetting coating material can be the same material used for the non-wetting layer in deaerator partition.

In embodiments, the contact angle is effected by providing a morphology on the wall defining the passageway, particularly on the non-wetting layer 54. For example, the walls of the passageway can be roughened to include a microstructured surface, such as a plurality of closely-spaced, sharp-tipped nanostructures as described in "Nanostructured Surfaces for Dramatic Reduction of Flow Resistance in Droplet-Based Microfluidics" by Joonwon Kim et al., IEEE publication number 0-7803-7185-2/02 pp. 479-482. In embodiments, the contact angle of the fluid in the passageway is 170° or greater.

Figure 4A:
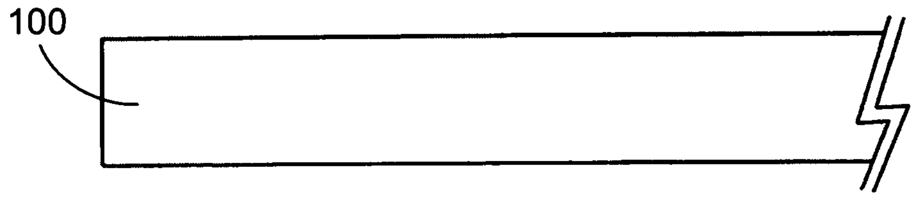
FIGS. 4A-4F are cross-sectional views illustrating the manufacture of a deaerator.
Figure 4B:
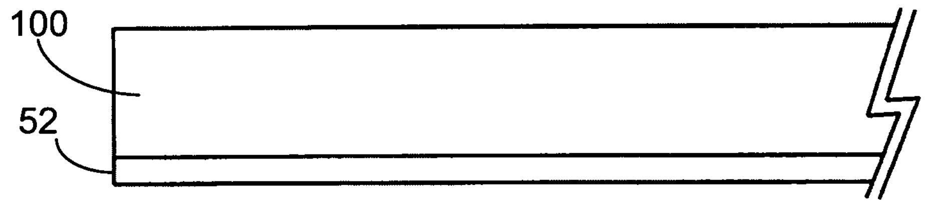
Figure 4C:
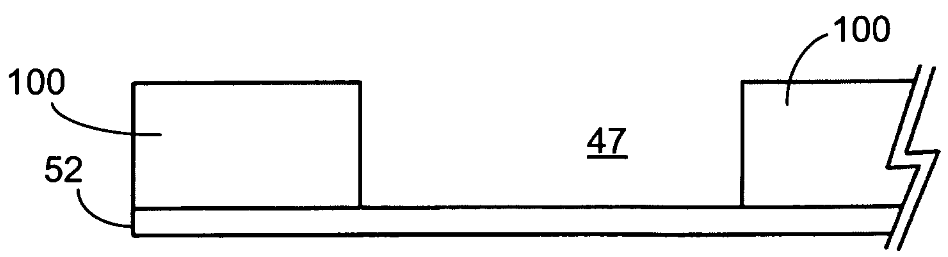
Figure 4D:
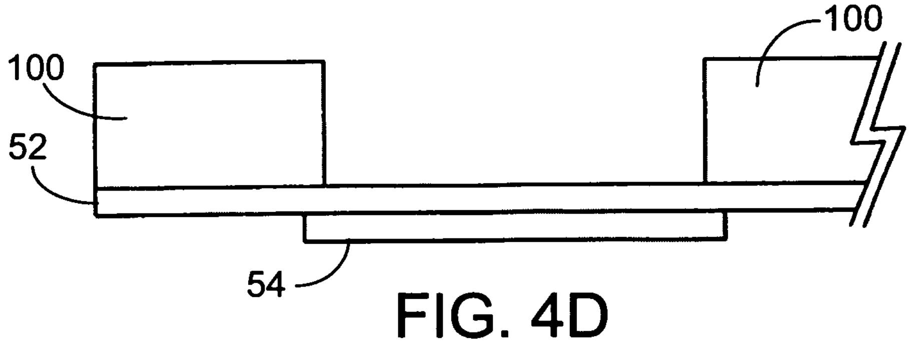
Figure 4E:
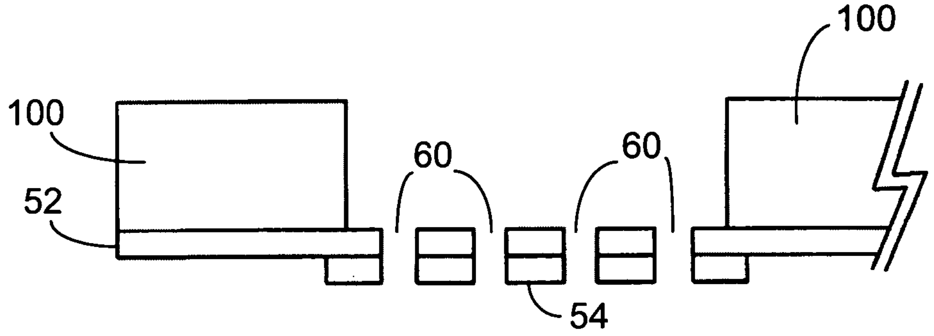
Figure 4F:
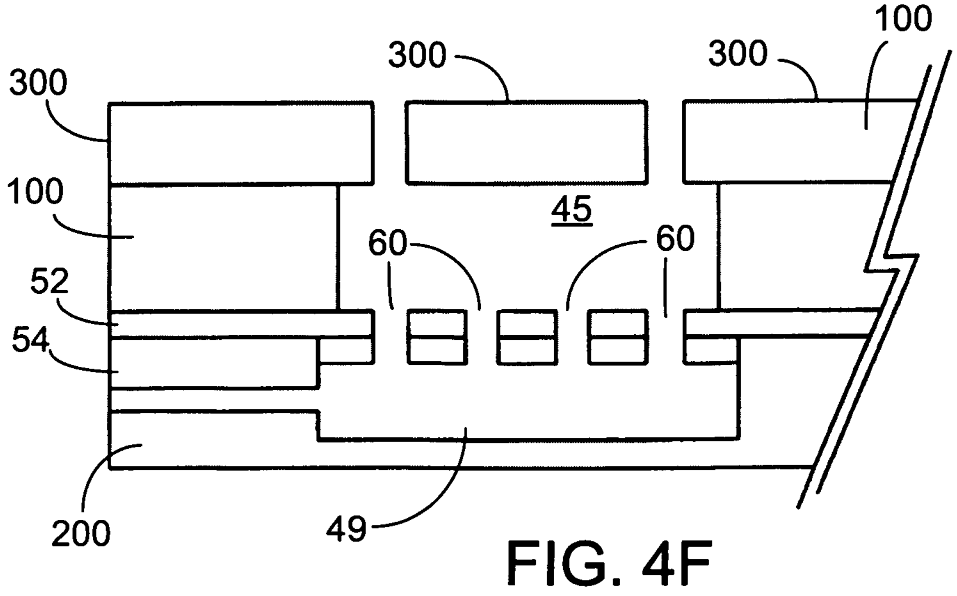

Referring to FIGS. 4A-4F, manufacture of deaerator is illustrated. Referring to FIG. 4A, a substrate 100 is provided. The substrate is a silicon wafer into which flow path features, such as the pumping chamber (not shown) are defined. Referring to FIG. 4B, a layer 52 of wettable material is formed on one side of the substrate 100. The wettable material is e.g., a silicon dioxide layer which can be thermally grown or deposited by vapor deposition. In an alternative embodiment, the silicon dioxide layer is provided by providing a silicon on insulator wafer. Referring to FIG. 4C, the substrate 100 is etched to form fluid reservoir region 47 and to expose the back of the wetting layer. Referring to FIG. 4D, a layer 54 of non-wetting material is deposited over the wetting material opposite the reservoir region 47. The non-wetting material is, e.g., a polymer which is formed by solvent casting or thermal deposition, followed by cross linking. Referring to FIG. 4E, passageways 60 are formed in the partition 50. The passageways 60 are formed, for example, by mechanical or excimer laser drilling or high density plasma etching through both the non-wetting layer and the wetting layer. Referring to FIG. 4F, substrates 200, 300, e.g., silicon substrate are provided (e.g., adhesively bonded to substrate 100) to complete reservoir region 47 and vacuum region 49.

While certain embodiments have been described, other embodiments are possible. For example, referring to FIGS. 5A and 5B, a partition 50 is oriented such that the non-wetting layer 54 is adjacent the reservoir region and the wetting layer 52 is adjacent the vacuum region.

Figure 6:
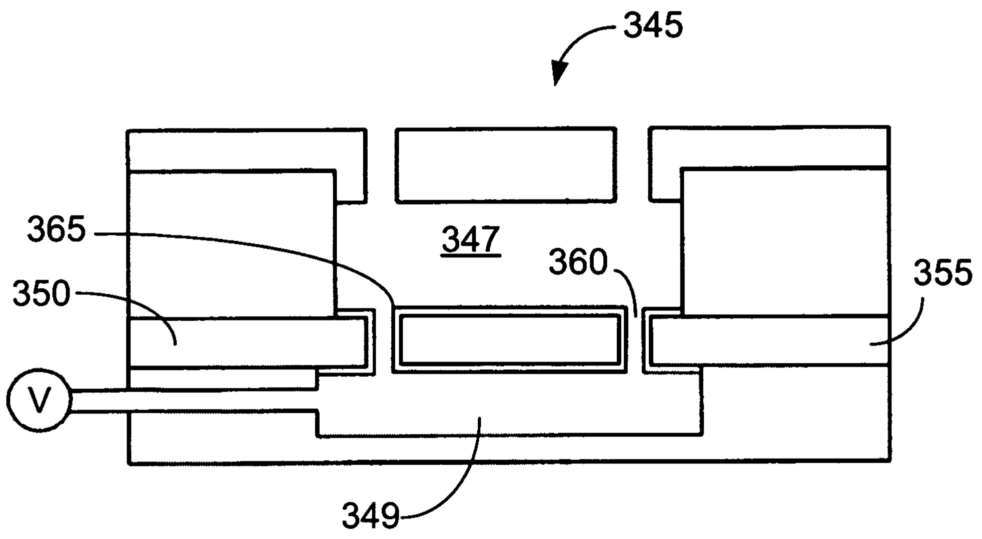
FIG. 6 is a cross-sectional view of a portion of a deaerator.

Referring to FIG. 6, in embodiments, a deaerator 345 includes a partition 350 positioned between ink reservoir region 347 and vacuum region 349. The partition 350 includes a layer 355 including through-holes 360 that extend from the ink reservoir region 347 to the vacuum region 349. Layer 355 can be formed of a silicon material (e.g., silicon wafer, silicon dioxide), a polymeric material (e.g. fluoropolymer) and/or a ceramic material (e.g., alumina, sapphire, zirconia, aluminum nitride). In addition, layer 355 can be formed from a material that provides a non-wettable surface along through-holes 360. A coating 365 of a non-wetting material (e.g., fluoropolymer) can be deposited over layer 355 such that the walls of the through-holes 360 are coated.

In embodiments, layer 355 has a thickness of about 5 microns or less, through-holes 360 have a diameter that is about 1 micron or less, preferably between about 200 nanometers and 800 nanometers, and coating 365 has a thickness about 10 nanometers to 80 nanometers. As a result, in some embodiments, the passageway through the through-holes 360 including coating 365 has an inner diameter of about 40 nanometers to about 780 nanometers. To form partition 350, layer 355 is plasma etched to include through-holes 360. After the through-holes 360 are formed in layer 355, coating 365 is deposited on layer 355 using vapor deposition techniques to coat layer 355 and the walls of the through-holes 360 with a non-wetting material. In some embodiments, layer 355 is formed of a non-wetting material (e.g., fluoropolymer), and partition 350 includes layer 355 and through-holes 360 (e.g., coating 365 is not included).

In embodiments, a separate deaerator is provided for each pumping chamber. In other embodiments, a single deaerator is provided for multiple pumping chambers. In embodiments, the partition includes more than two layers. For example, multiple layers of the same or different wettable materials, e.g. silicon and silicon oxide can be used to provide a composite wettable layer. Multiple layers of the same or different non-wettable material can be provided to form a composite non-wettable layer. In embodiments, the partition includes a plurality of alternate wettable and non-wettable materials. The alternate layers provide combinations of adjacent wettable and non-wettable materials selected to provide and retain a meniscus for fluids of different surface energy and/or at different vacuum pressures.

Still further embodiments follow. For example, while ink can be deaerated within and jetted from printhead unit, the printhead unit can be utilized to eject fluids other than ink. For example, the deposited droplets may be a UV or other radiation curable material or other material, for example, chemical or biological fluids, capable of being delivered as drops. For example, the printhead unit 20 described could be part of a precision dispensing system.

All of the features disclosed herein may be combined in any combination. Each feature disclosed may be replaced by an alternative feature serving the same, equivalent, or similar purpose. Thus, unless expressly stated otherwise, each feature disclosed is only an example of a generic series of equivalent or similar features.

All publications, applications, and patents referred to in this application are herein incorporated by reference to the same extent as if each individual publication or patent was specifically and individually indicated to be incorporated by reference in their entirety.

Still other embodiments are in the following claims.

What is claimed is:

1. A method of forming a printhead, comprising:

providing a body of silicon material, forming in the body of silicon material at least a portion of a flow path in which fluid is to be pressurized, and forming in the body of silicon material at least a portion of a deaerator partition between a first region and a second region that are connected by a passageway, the deaerator partition being configured to remove gases or bubbles from the fluid, the first region characterized by a first air pressure and the second region characterized by an air pressure different from the first air pressure.

2. The method of claim 1, wherein the partition comprises a single layer.

3. The method of claim 1, wherein the partition comprises two or more layers.

4. The method of claim 1, wherein a diameter of the passageway is between about 200 nanometers and about 800 nanometers.

5. The method of claim 1, also comprising roughening a wall of the passageway to form a microstructured surface.

6. The method of claim 1 in which forming the at least a portion of the deaerator partition comprises etching the silicon material to reduce a thickness of the body of the silicon material.

7. The method of claim 1 in which the silicon material comprises a silicon layer and a silicon dioxide layer.

8. The method of claim 7 in which forming the at least a portion of the deaerator partition comprises etching the silicon layer to the silicon dioxide layer.

9. The method of claim 1 in which the body of silicon material comprises a wetting layer and a silicon layer and forming the at least a portion of the deaerator partition comprises etching the silicon layer to the wetting layer.

10. The method of claim 1 also comprising forming a polymer layer on the body of the silicon material.

11. The method of claim 10 comprising forming the polymer layer by depositing a polymer or a monomer.

12. The method of claim 10 also comprising forming one or more channels through the polymer layer.

13. The method of claim 11, comprising forming the channels by laser drilling.

14. The method of claim 11, comprising forming the channels by etching.

15. The method of claim 1, wherein the first region is in connection with the flow path and the second region is to be connected to a vacuum.

16. The method of claim 1 in which the passageway includes a non-wetting surface.

17. The method of claim 16, wherein the non-wetting surface is on a side closest to the second region, and the passageway further includes a wetting surface on a side closest to the first region.

18. The method of claim 1, wherein the passageway is further configured to allow gases and air bubbles to move from a liquid in the first region to the second region when the second region is connected to a vacuum and the vacuum applies a vacuum pressure, $P_v$, in the second region while still preventing liquid from entering the second region.

19. The method of claim 18, wherein the passageway is cylindrical and has a radius, R, defined by an equation:

$$R \leq \frac{2(\gamma_{lv})}{P_v}$$

where $\gamma_{lv}$, is a surface energy of a liquid-vapor interface.

20. The method of claim 18, wherein the passageway is cylindrical and each has a radius, R, defined by an equation:

$$R \leq \frac{2(\gamma_{sl} - \gamma_{sv})}{P_v}$$

where $\gamma_{sl}$ is a surface energy of a liquid-solid interface, and $\gamma_{sv}$ is a surface energy of a solid-vapor interface.

21. The method of claim 18, wherein $P_v$ is about 1 atmosphere or less, then a radius of the passageway is about 5 microns or less.

22. The method of claim 1, wherein the first and second regions and the passageway are configured to prevent a liquid in the first region from entering the second region.

* * * * *

UNITED STATES PATENT AND TRADEMARK OFFICE

CERTIFICATE OF CORRECTION

PATENT NO. : 8,635,774 B2
APPLICATION NO. : 11/409635
DATED : January 28, 2014
INVENTOR(S) : Paul A. Hoisington and John C. Batterton It is certified that error appears in the above-identified patent and that said Letters Patent is hereby corrected as shown below:

In the Claims:

Column 9, Line 14, In Claim 13, delete "claim 11," and insert -- claim 12, --

Column 9, Line 16, In Claim 14, delete "claim 11," and insert -- claim 12, --

Column 10, Line 12 (Approx.), In Claim 19, delete " $\gamma_{1v'}$ " and insert -- $\gamma_{1v}$ --

Signed and Sealed this
Third Day of June, 2014

Michelle K. Lee

Michelle K. Lee
*Deputy Director of the United States Patent and Trademark Office*